United States Patent [19]

Muraoka et al.

[11] 4,428,452
[45] Jan. 31, 1984

[54] FOUR-WHEEL-DRIVE SYSTEM FOR VEHICLE

[75] Inventors: Akihiko Muraoka, Yokohama; Kunihiko Suzuki, Fujisawa, both of Japan

[73] Assignee: Nissan Motor Company, Limited, Yokohama, Japan

[21] Appl. No.: 249,419

[22] Filed: Mar. 31, 1981

[30] Foreign Application Priority Data

Apr. 25, 1980 [JP] Japan .................. 55-55732

[51] Int. Cl.³ .................. B60K 5/04; B60K 17/34
[52] U.S. Cl. .................. 180/249; 74/710.5
[58] Field of Search .......... 180/233, 248, 249, 250, 180/297; 74/682, 710.5, 714, 740, 785, 788

[56] References Cited

U.S. PATENT DOCUMENTS

| 3,265,173 | 8/1966 | Russell | 74/710.5 |
| 3,350,960 | 11/1967 | Lamburn et al. | 74/740 |
| 3,378,093 | 4/1968 | Hill | 180/249 |
| 3,557,634 | 1/1971 | Bixby | 74/710.5 |
| 3,889,771 | 6/1975 | Kronogard | 180/248 |
| 3,895,546 | 7/1975 | Yamaguchi et al. | 74/710.5 |
| 4,074,591 | 2/1978 | Dick | 74/710.5 |
| 4,208,923 | 6/1980 | Ikegami | 74/665 G X |

FOREIGN PATENT DOCUMENTS

| 491645 | 9/1938 | United Kingdom . |
| 887849 | 1/1962 | United Kingdom . |
| 2064449 | 6/1981 | United Kingdom | 180/248 |

Primary Examiner—Joseph F. Peters, Jr.
Assistant Examiner—Ross Weaver
Attorney, Agent, or Firm—Lane, Aitken & Kananen

[57] ABSTRACT

A four-wheel-drive system for a vehicle, comprising a power unit having an output shaft in a lateral direction of the vehicle, a power transmission gear unit having input and output shafts parallel with the output shaft of the power unit, a speed reduction gear to be driven by the transmission output shaft, two final reduction gear units one of which is arranged for driving the front road wheels and the other of which is arranged to drive the rear road wheels of the vehicle, and a planetary gear assembly including a sun gear connected to one of the final reduction gear units, a ring gear connected to the other of the final reduction gear, and a pinion carrier connected to the speed reduction gear, the planetary gear assembly being capable of providing a differential action between the sun and ring gears thereof.

8 Claims, 8 Drawing Figures

FOUR-WHEEL-DRIVE SYSTEM FOR VEHICLE

FIELD OF THE INVENTION

The present invention relates to a four-wheel-drive system for a vehicle having at least two pairs of road wheels consisting of a pair of front road wheels and a pair of rear road wheels and, more particularly, to a four-wheel-drive system for such a wheeled vehicle.

BACKGROUND OF THE INVENTION

A known four-wheel-drive vehicle uses a driveline including an engine and a power transmission gear unit which are arranged in series in a fore-and-aft direction of the vehicle. The driving power delivered from the engine is split by means of a power transfer mechanism into two component powers one of which is transmitted through a front final reduction gear unit to the wheel axles for the front road wheels and the other of which is transmitted through a rear final reduction gear unit to the wheel axles for the rear road wheels.

Such a series arrangement of the engine and the power transmission gear unit requires an elongated vehicle chassis and, for this reason, results in deterioration in the stability of steering due to extended overhangs of the vehicle body. Furthermore, the transmission gear unit in the series engine and transmission arrangement occupies a portion of the spaces which could otherwise be utilized as the passenger and baggage spaces, thereby encumbering the availablity of the passenger and baggage spaces of the vehicle.

On the other hand, there is a recent trend to use a front-engine front-wheel-drive system with the engine positioned to have its output shaft in a lateral direction of a vehicle. Such a drive system for a wheeled vehicle is advantageous for improving the stability of steering and unencumbering the space availability of the vehicle. A problem has, however, been encountered in a vehicle driving system of this nature in that the power train including the power transmission gear unit and the front final reduction gear unit of the driving system can not be utilized without modification as the power train in a four-wheel-drive system with an engine positioned to have its output shaft in a lateral direction of the vehicle. The power train for the driving system for a four-wheel-driven vehicle must have therefore be designed and engineered independently of the power train for a front-engine front-wheel-drive system. This requires an additional cost for the designing and engineering of a four-wheel-drive system with an engine positioned to have its output shaft in a lateral direction of the vehicle.

The present invention therefore contemplates provision of a four-wheel-drive system which can be realized by using, without any important modification, the power train of a conventional front-engine front-wheel-drive system with a lateral engine axis.

SUMMARY OF THE INVENTION

In accordance with the present invention, there is provided a four-wheel-drive system for a vehicle having at least two pairs of road wheels consisting of a pair of front road wheels and a pair of rear road wheels, comprising a power unit having an output shaft rotatable about an axis in a lateral direction of the vehicle; a power transmission gear unit including transmission input and output shafts each having an axis of rotation substantially parallel with the axis of rotation of the output shaft of the power unit, and gears mounted on the transmission input and output shafts and arranged to be capable of selectively producing a plurality of ratios between the speeds of rotation of the transmission input and output shafts; a speed reduction gear with which the transmission output shaft is held in driving engagement for driving the reduction gear to rotate about an axis of rotation thereof; a first final reduction gear unit including gears arranged to split an input driving power into two output components to be transmitted to one of the above mentioned two pairs of road wheels; a second final reduction gear unit including gears arranged to split an input driving power into two output components to be transmitted to the other of the aforesaid two pairs of road wheels; and a planetary gear assembly including an externally toothed sun gear rotatable about an axis of rotation thereof, an externally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together so that the planet pinions are revolvable together around the axis of rotation of the sun gear, the speed reduction gear being held in driving engagement with the pinion carrier, one of the sun gear and the ring gear being in driving engagement with one of the first and second final reduction gear units and the other of the sun and ring gears being in driving engagement with the other of the first and second final reduction gear unit.

DESCRIPTION OF THE DRAWINGS

The features and advantages of the four-wheel-drive system according to the present invention will be more clearly understood from the following description in which like reference numerals and characters designate corresponding or similar members and structures throughout the figures of the drawings and in which.

DESCRIPTION OF THE EMBODIMENTS

Description will be hereinafter made regarding the embodiments of the vehicle driving system according to the present invention.

Figure 1A:
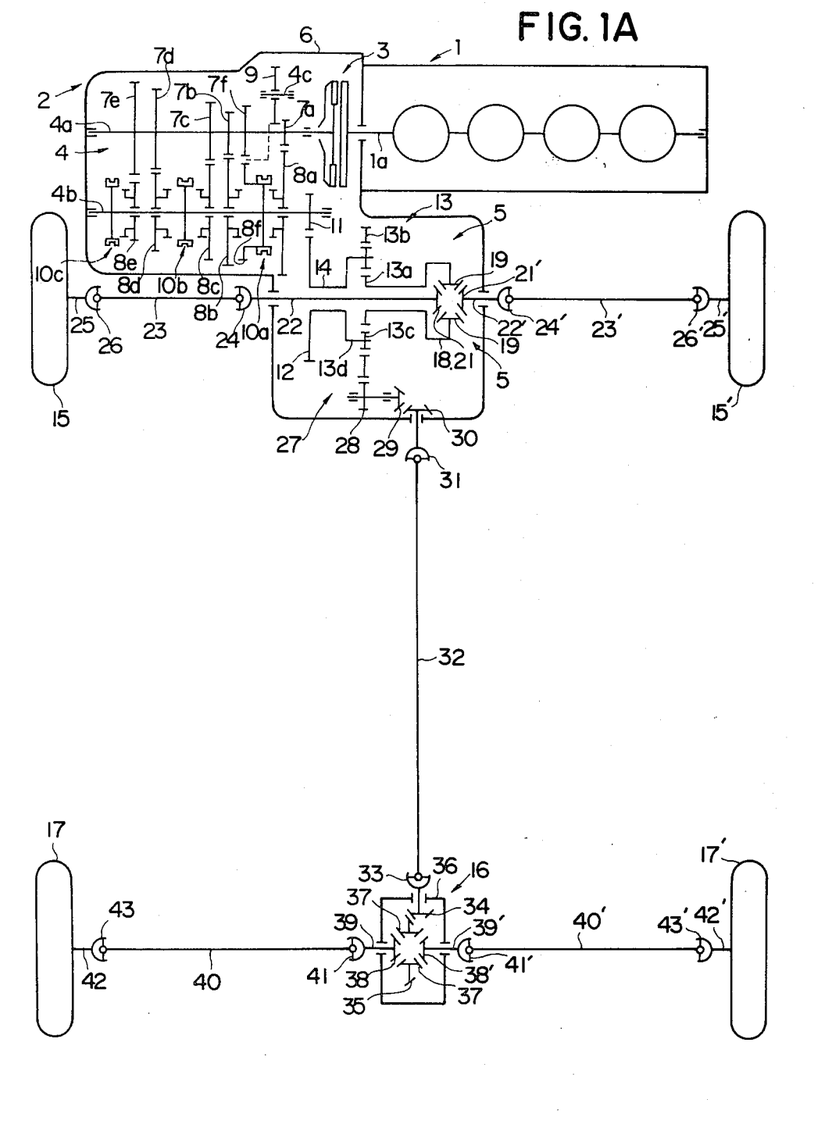
FIG. 1A is a schematic view showing the general construction of a first preferred embodiment of the four-wheel-drive system according to the present invention.
Figure 1B:
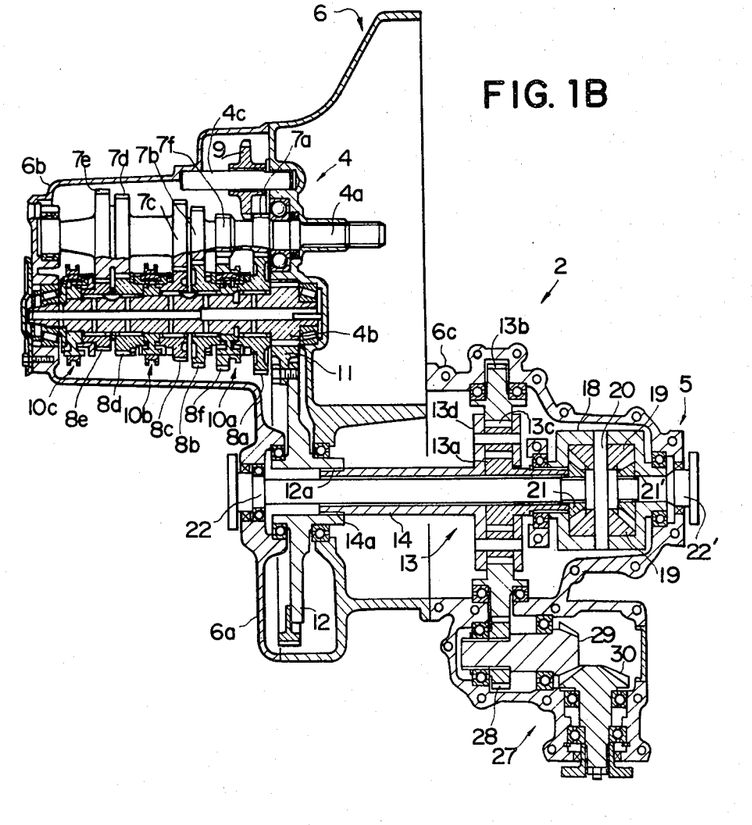
FIG. 1B is a fragmentary sectional view showing part of the detailed construction and arrangement of the embodiment illustrated in FIG. 1A.

Referring to FIGS. 1A and 1B of the drawings, the four-wheel-drive system embodying the present invention comprises a power unit which is shown constituted by an internal combustion engine 1 having an output shaft 1a. The four-wheel-drive system proposed by the present invention features the crosswise-positioned engine arrangement and, thus, the engine 1 is installed on the chassis of a wheeled vehicle in such a manner that the output shaft 1a extends horizontally in a lateral direction of the chassis. Furthermore, the four-wheel-drive system embodying the present invention is assumed, by way of example, as being of the front-engine design and, thus, the engine 1 is positioned at the front of the chassis of the vehicle. When the engine 1 is of the reciprocating-piston type, the output shaft 1a thereof is constituted by the crankshaft of the engine.

The four-wheel-drive driving system embodying the present invention further comprises a manually operated transmission-front-axle or, briefly, a transaxle mechanism 2 which includes a mechanical clutch unit 3, a manually-operated power transmission gear unit 4, and a front final reduction gear unit 5. The mechanical clutch unit 3 comprises a driving member connected to the output shaft 1a of the engine 1 and a driven member engageable with the driving member and connected to a transmission input shaft 4a forming part of the transmission gear unit 4. The clutch unit 3 further comprises a pressing member axially movable on the transmission input shaft 4a and is adapted to force the driven member into engagement with the driving member when actuated for axial movement on the shaft 4a. The pressing member is biased by means of a spring (not shown) for connecting the driven member to the driving member, as is well known in the art.

The transmission input shaft 4a axially extends in alignment with the output shaft 1a of the internal combustion engine 1 and is journalled in suitable bearings supported on a transaxle casing structure 6. The transmission gear unit 4 is assumed, by way of example, as being of the five-forward-speed and one-reverse-speed type and comprises a total of six drive gears fixedly mounted on or integral with the transmission input shaft 4a and axially spaced apart from each other on the shaft 4a. The drive gears consist of a first-speed forward drive gear 7a, a second-speed forward drive gear 7b, a third-speed forward drive gear 7c, a fourth-speed forward drive gear 7d, a fifth-speed forward drive gear 7e, and a reverse drive gear 7f.

The transaxle casing structure 6 has further supported thereon a transmission output shaft 4b which axially extends in parallel with the transmission input shaft 4a and which has opposite axial end portions respectively journaled in suitable bearings mounted on the casing structure 6. The transmission output shaft 4b has coaxially mounted thereon a total of six driven gears which are axially spaced apart from each other on the shaft 4b and which are freely rotatable independently of one another on the shaft 4b about the center axis of the shaft 4b. The driven gears on the transmission output shaft 4b consist of a first-speed forward driven gear 8a, a second-speed forward driven gear 8b, a third-speed forward driven gear 8c, a fourth-speed forward driven gear 8d, a fifth-speed forward driven gear 8e, and a reverse driven gear 8f. The first-speed to fifth-speed driven gears 8a to 8e on the transmission output shaft 4b are paired and held in mesh with the first-speed to fifth-speed drive gears 7a to 7e, respectively, on the transmission input shaft 4a. On the other hand, the reverse driven gear 8f on the output shaft 4b is engageable with the reverse drive gear 7f on the input shaft 4a through the intermediary of a reverse idler gear 9 axially movable and coaxially rotatable on an idler gear shaft 4c. The idler gear shaft 4c also extends axially in parallel with the transmission input shaft 4a and is secured to the transaxle casing structure 6.

The power transmission gear unit 4 is assumed, by way of example, as being of the fully synchronized type and, thus, further comprises three synchronizing clutch assemblies each of which is coaxially mounted on and rotatable with the transmission output shaft 4b. The synchronizing clutch assemblies are shown consisting of a first-second-speed synchronizing clutch assembly 10a, a third-fourth-speed synchronizing clutch assembly 10b, and a fifth-speed synchronizing clutch assembly 10c. The first-second-speed synchronizing clutch assembly 10a axially intervenes between the first-speed and second-speed forward driven gears 8a and 8b and is selectively engageable with these gears 8a and 8b and, likewise, the third-fourth-speed synchronizing clutch assembly 10b axially intervenes between the third-speed and fourth-speed forward driven gears 8c and 8d and is selectively engageable with these gears 8c and 8d. The fifth-speed synchronizing clutch assembly 10c is provided in association with the fifth-speed forward driven gear 8e and is engageable with the gear 8e.

As is well known in the art and will be seen from the illustration of FIG. 1A, each of the synchronizing clutch assemblies 10a and 10b is largely composed of an externally toothed clutch hub splined to the transmission output shaft 4b between the gears 8a and 8b or gears 8c and 8d, a pair of externally toothed synchronizing or blocking rings positioned adjacent to the opposite axial ends of the clutch hub and engageable with the clutch hub, and an internally toothed annular coupling sleeve held in mesh with and axially movable on the clutch hub. The synchronizing rings of each of the clutch assemblies 10a and 10b are rotatable with the gears 8a and 8b or the gears 8c and 8d, respectively. The synchronizing clutch assembly 10c is constructed similarly to each of the clutch assemblies 10a and 10b but has only one synchronizing ring rotatable with the gear 8e. Each of the gears 8a to 8e has or is formed with a coupling gear section adjacent to the associated synchronizing ring. The coupling sleeve of each of the clutch assemblies 10a, 10b and 10c is axially movable into engagement with the coupling gear section of one or the other of the gears 8a and 8b or gears 8c and 8d of the gear 8e past the associated synchronizing ring so as to establish synchronized coupling between the transmission output shaft 4b and the gear engaged by the coupling sleeve. The coupling sleeve of each clutch assembly is formed with a circumferential groove through which a gear shifter fork (not shown) is held in circumferentially slidable engagement with the sleeve. The shifter forks thus engaging the respective coupling sleeves of the individual clutch assemblies 10a, 10b and 10c are, in turn, respectively carried on gearshift control rods or rails which are operatively connected to or engaged by a manually operated gearshift lever through suitable gearshift control linkages, though not shown in the drawings.

The reverse driven gear 8f is constituted as part of the coupling sleeve of the first-second-speed synchronizing clutch assembly 10a. The reverse idler gear 9 is engaged by a gear shifter fork (not shown) carried on the gearshift control rod or rail carrying the shifter fork engaging the coupling sleeve of the fifth-speed synchronizing clutch assembly 10c. The shafts 4a to 4c and all the gears and clutch assemblies mounted on these shafts are enclosed within the transaxle casing structure 6.

The construction and arrangement of the transmission gear unit 4 as hereinbefore described and shown in FIGS. 1A and 1B is per se simply for the purpose of illustration and may therefore be changed and/or modified in numerous manners as desired.

The output shaft 4b of the transmission gear unit 4 has fixedly mounted thereon a transmission output gear 11 which is rotatable about the center axis of the shaft 4b.

The transaxle mechanism 2 of the embodiment shown in FIGS. 1A and 1B further includes a speed reduction gear 12 and a planetary gear assembly 13 which are enclosed together with the transmission gear unit 4 and the front final reduction gear unit 5 within the transaxle casing structure 6.

The speed reduction gear 12 has opposite axial extensions or boss portions respectively journaled in suitable bearings supported on the transaxle casing structure 6 and is rotatable about an axis substantially parallel with the axis of rotation of the transmission output shaft 4b. The reduction gear 12 is held in mesh with the above mentioned transmission output gear 11 and is formed with an axial bore defined by an internally serrated inner peripheral wall 12a (FIG. 1B) which is substantially coaxial with the gear 12 as a whole. The speed reduction gear 12 is larger in diameter and accordingly in number of teeth than the transmission output gear 11 and is thus adapted to rotate at a speed lower in a ratio determined by the ratio between the numbers of teeth of the gears 11 and 12 and the transmission output gear 11.

The planetary gear assembly 13 is positioned intermediate between the front final reduction gear unit 5 and the above described speed reduction gear 12 and comprises an externally toothed sun gear 13a, an internally toothed ring gear 13b coaxially encircling the sun gear 13a and two or more planet pinions 13c each intervening between the sun gear 13a and the ring gear 13b. The sun gear 13a is rotatable about an axis substantially aligned with the axis of rotation of the speed reduction gear 12 and is formed with an axial bore. Each of the planet pinions 13c is rotatable about an axis substantially parallel with the axis of rotation of the sun gear 13a and is held in mesh with both of the sun gear 13a and the ring gear 13b. The planet pinions 13c are connected together by means of a pinion carrier 13d and are, thus, not only rotatable individually about their respective axes of rotation but revolvable together about the common axis of rotation of the sun gear 13a and the ring gear 13b. The ring gear 13b is rotatably supported on the transaxle casing structure 6 by means of suitable bearings as shown in FIG. 1B. The ring gear 13b is toothed not only internally but externally.

The pinion carrier 13d of the planetary gear assembly 13 thus constructed has a tubular axial extension 14 formed with an axial bore having a center axis substantially coincident with the common axis of rotation of the sun and ring gears 13a and 13b. The axial extension 14 has an externally serrated leading end portion 14a axially projecting into the bore in the speed reduction gear 12 and splined to the internally serrated inner peripheral wall 12a of the gear 12. The pinion carrier 13d is, thus, rotatable with the speed reduction gear 12 about the common axis of rotation of the sun gear 13a and the ring gear 13b and is therefore driven to rotate about the axis of rotation thereof when a driving power is transmitted from the transmission output gear 11 to the speed reduction gear 12. In the above described arrangement of the speed reduction gear 12 and the pinion carrier 13d, it is important that the particular two rotatable members are constructed separately of each other and are detachably coupled together in such a manner that the members are rotatable as a single unit about the aligned respective axes of rotation thereof.

The driving power transmitted from the reduction gear 12 to the pinion carrier 13d of the planetary gear assembly 13 is split into two output components, one of which is transmitted through the front final reduction gear unit 5 to a pair of front road wheels 15 and 15' and the other of which is transmitted through a rear final reduction gear unit 16 to a pair of rear road wheels 17 and 17'.

The front final reduction gear unit 5 consists essentially of a differential gear assembly comprising a differential gear casing 18 which is rotatable about an axis substantially aligned with the common axis of rotation of the sun and ring gears 13a of the planetary gear assembly 13. The gear casing 18 has opposite axial extensions or boss portions respectively journaled in suitable bearings supported by the transaxle casing structure and has carried therein two pairs of differential bevel pinions 19 which are rotatably mounted on two pinion cross shafts 20 (FIG. 1B) secured to the gear casing 18 and extending at right angles to each other and to the axis of rotation of the gear casing 18, as will be seen from FIG. 1B in which only two of the four bevel pinions 19 are shown mounted on one of the cross shafts 20. The individual bevel pinions 19 are, thus, rotatable not only together with the gear casing 18 and cross shafts 20 about the axis of rotation of the gear casing 18 but also independently of one another about the center axes of the cross shafts 20, viz., axes perpendicular to the axis of rotation of the gear casing 18. The sun gear 13a of the planetary gear assembly 13 has a tubular axial extension connected to the differential gear casing 18, which is thus rotatable about the axis of rotation thereof together with the sun gear 13a.

The four differential bevel pinions 19 intervene between and are held in mesh with a pair of differential side bevel gears 21 and 21' which are rotatable about the axis of rotation of the differential gear casing 18 and which are also carried in the gear casing 18. The side bevel gears 21 and 21' are splined to inner end portions of a pair of side gear shafts 22 and 22', respectively, extending from the gear casing 18 in a lateral direction of the vehicle chassis. One of the side gear shafts such as the side gear shaft 22 carrying the side bevel gear 21 as shown axially extends in part through the axial bore in the sun gear 13a and the axial bore in the tubular extension 14 of the pinion carrier 13d and in part through the axial bore in the speed reduction gear 12 as will be better seen from FIG. 1B. The other side gear shaft 22' connected to the side bevel gear 21' axially extends in the opposite direction to the side gear shaft 22 outwardly from the differential gear casing 18.

The side gear shafts 22 and 22' form part of front axle assemblies which further comprise front wheel drive shafts 23 and 23' connected to the side gear shafts 22 and 22' through suitable coupling means such as constant-velocity joints 24 and 24′, respectively. The front wheel drive shafts 23 and 23′ in turn extend outwardly from the constant-velocity joints 24 and 24′ in a lateral direction of the vehicle chassis and are connected at their outer axial ends to front wheel axles 25 and 25′ for the front road wheels 15 and 15′ through suitable coupling means such as constant-velocity joints 26 and 26′, respectively.

The construction and arrangement of the front final reduction gear unit 5 as hereinbefore described and shown in FIGS. 1A and 1B is per se simply for the purpose of illustration and may thus be changed and/or modified in numerous manners as desired.

The sun gear 13a of the planetary gear assembly 13 in the embodiment of FIGS. 1A and 1B thus serves as the power output member for transmitting a driving power to the front road wheels 15 and 15′ through the front final reduction gear unit 5. On the other hand, the ring gear 13b of the planetary gear assembly 13 serves as the power output member for transmitting a driving power to the rear road wheels 17 and 17′ through the rear final reduction gear unit 16. For this purpose, the rotation of the ring gear 13b is converted into rotation about an axis perpendicular to the axis of rotation of the ring gear 13b by means of a right-angle power transfer gear unit 27 which is enclosed within a rearward extension of the transaxle casing structure 6.

The right-angle power transfer gear unit 27 comprises a branch-off gear 28 fixedly mounted on and coaxially rotatable with an axial extension of a driving bevel gear 29 which is journaled in suitable bearings on the rearward extension of the casing structure 6 and which is rotatable about an axis substantially parallel with the axis of rotation of the ring gear 13b. The branch-off gear 28 is held in mesh with the ring gear 13b and is, thus, driven for rotation together with the driving bevel gear 29 about the axis of rotation of the bevel gear 29 when the ring gear 13b is driven by the pinion carrier 13d about the axis of rotation thereof.

The driving bevel gear 29 is held in mesh with a driven bevel gear 30 which has an axial extension journaled in suitable bearings supported on the rearward extension of the transaxle casing structure 6. The driven bevel gear 30 is rotatable about an axis extending at right angles to the axis of rotation of the driving bevel gear 29, viz., in a fore-and-aft direction of the chassis of the vehicle. It may be herein mentioned that the relationship between the axis of rotation of the driving bevel gear 29 and the axis of the rotation of the driven bevel gear 30 is such that the particular two axes of rotation are substantially at right angles to each other but are not necessarily in a perpendicularly intersecting relationship to each other.

The axial extension of the driven bevel gear 30 projects rearwardly from the rearward extension of the casing sutructure 6 through an opening formed in the rearward extension and is connected through suitable coupling means such as a universal joint 31 to a propeller shaft 32 extending rearwardly from the universal joint 31 in a fore-and-aft direction of the vehicle chassis as schematically shown in FIG. 1A.

The propeller shaft 32 forms part of a driveline for the rear road wheels 17 and 17′ and is rearwardly connected through suitable coupling means such as a universal joint 33 to the rear final reduction gear unit 16.

As shown schematically in FIG. 1A, the rear final reduction gear unit 16 comprises a driving bevel pinion 34 connected to the above mentioned propeller shaft 32 through the universal joint 33 and has an axis of rotation in a fore-and-aft direction of the vehicle chassis. The driving bevel pinion 34 is held in mesh with a bevel ring gear 35 having an axis of rotation at right angles to the axis of rotation of the driving bevel pinion 34. The driving bevel pinion 34 and the bevel ring gear 35 constitute, in combination, right-angle power transfer gear means adapted to convert the rotation of the propeller shaft 32 about the axis of rotation thereof into rotation of the bevel ring gear 35 about an axis perpendicular, in an intersecting or a non-intersecting relationship, to the axis of rotation of the propeller shaft 32. Such bevel gears 34 and 35 are housed in a stationary gear casing 36 and are each journaled in suitable bearings (not shown) supported on the gear casing 36.

Similarly to the previously described front final reduction gear unit 5, the rear final reduction gear unit 16 consists of a differential gear assembly and, thus, further comprises a rotatable gear casing (not shown) which is secured to or intergral with the above mentioned bevel ring gear 35. The gear casing is rotatable with the ring gear 35 about the center axis thereof with respect to the above mentioned stationary gear casing 36 and has carried therein two pairs of differential bevel pinions 37 which are rotatably mounted on two pinion cross shafts (not shown) secured to the rotatable gear casing. The bevel pinions 37 are thus rotatable not only together with the cross shafts and the rotatable gear casing about the axis of rotation of the ring gear 35 but also independently of one another about the center axes of the cross shafts, viz., axes perpendicular to the axis of rotation of the ring gear 35.

The differential bevel pinions 37 intervene between and held in mesh with a pair of differential side bevel gears 38 and 38′ which are rotatable about the axis of rotation of the ring gear 35 and which are also carried in the above mentioned rotatable gear casing. The side bevel gears 38 and 38′ are splined to inner end portions of a pair of side gear shafts 39 and 39′, respectively, which extend from the stationary gear casing 36 in a lateral direction of the vehicle chassis through openings in opposite side wall portions of the gear casing 36. The side gear shafts 39 and 39′ form part of rear axle assemblies which further comprise rear wheel drive shafts 40 and 40′ connected to the side gear shafts 39 and 39′ through suitable coupling means such as constant-velocity joints 41 and 41′, respectively. The rear wheel drive shafts 40 and 40′ in turn extend outwardly from the constant-velocity joints 41 and 41′ in a lateral direction of the vehicle chassis and are connected at their outer aixal ends to rear wheel axles 42 and 42′ of the rear road wheels 17 and 17′ through suitable coupling means such as constant-velocity joints 43 and 43′, respectively.

The construction and arrangement of the rear final reduction gear unit 16 as hereinbefore described and shown in FIG. 1A is per se simply by way of example and may therefore be changed and/or modified in numerous manners as desired.

As will be seen from FIG. 1B, the transaxle casing structure 6 of the four-wheel-drive system constructed and arranged as hereinbefore described comprises a clutch housing portion 6a having the clutch unit 3 and the speed reduction gear 12 enclosed therein, a transmission gear housing portion 6b having the transmission gear unit 4 enclosed therein, and a power transfer gear housing portion 6c having the front final reduction gear unit 5 and the planetary gear assembly 13 enclosed therein. The power transfer gear housing portion 6c is constructed separately of the clutch and transmission gear housing portions 6a and 6b and is detachably connected to the clutch housing portion 6a by suitable fastening means (not shown) preferably in the neighborhood of the coupling between the speed reduction gear 12 and the pinion carrier 13d or more specifically the axial extension 14 of the pinion carrier 13d of the planetary gear assembly 13 positioned within the housing portion 6c.

Description will be hereinafter made regarding the operation of the vehicle driving system constructed and arranged as hereinbefore described with reference to FIGS. 1A and 1B.

When the engine 1 is in operation and the clutch unit 3 is in a coupled condition, the driving power delivered from the output shaft 1a of the engine 1 is transmitted through the clutch unit 3 to the input shaft 4a of the power transmission unit 4. Before the clutch unit 3 is actuated into the coupled condition, the transmission gearshift lever (not shown) is manually operated to select the gearshift control rod or rail carrying the shifter fork engaging the synchronizing clutch assembly 10a, 10b or 10c to be put into motion on the transmission output shaft 4b if it is desired to select one of the forward-drive gear ratios. Further manipulation of the gear-shift lever causes the particular gearshift control rod or rail to move axially with the shifter fork carried thereon and causes the associated synchronizing clutch assembly to axially move on the transmission output shaft 4b in a direction to produce synchronized coupling between the transmission output shaft 4b and the selected one of the gears 8a to 8e on the shaft 4b. If, on the other hand, it is desired to select the reverse-drive gear ratio, the reverse idler gear 9 is actuated to axially move on the idler gear shaft 4c into the position meshing with the reverse drive gear 7f and the reverse driven gear 8f on the shafts 4a and 4b, respectively.

When one of the gears 8a to 8e on the transmission output shaft 4b is coupled to the shaft 4b through the associated synchronizing clutch 10a, 10b or 10c or the reverse idler gear 9 is moved into mesh with the gears 7f and 8f, the driving power carried through the clutch unit 3 to the transmission input shaft 4a is transmitted to the transmission output shaft 4b through the selected pair of gears on the shafts 4a and 4b or through the gears 7f, 8f and 9. The rotation of the transmission output shaft 4b thus driven for rotation at a speed proportioned in the selected ratio to the rotational speed of the transmission input shaft 4a is transmitted through the transmission output gear 11 on the shaft 4b to the speed reduction gear 12 and is reduced in speed with a ratio determined by the ratio between the numbers of teeth of the transmission output gear 11 and the speed reduction gear 12. The rotation of the speed reduction gear 12 in turn is transmitted to the pinion carrier 13d of the planetary gear assembly 13 through the coupling between the gear 12 and the axial extension 14 of the pinion carrier 13d and causes the pinion carrier 13d to rotate with the planet pinions 13c about the common axis of rotation of the sun gear 13a and ring gear 13b. The driving power thus transmitted to the pinion carrier 13d is split into two output components respectively driving the sun gear 13a and the ring gear 13b for rotation about the common axis of rotation thereof. The planetary gear assembly 13 thus functions as a differential unit and is operative to adjust the differential speed of rotation between the sun gear 13a for driving the front road wheels 15 and 15' and the ring gear 13b for driving the rear road wheels 17 and 17'.

The driving power transmitted from the pinion carrier 13d to the sun gear 13a of the planetary gear assembly 13 is transmitted to the differential gear casing 18 of the front final reduction gear unit 5 and through the gear casing 18 and the cross shafts 20 to the differential bevel pinions 19. The differential bevel pinions 19 in turn drive the differential side bevel gears 21 and 21' for rotation with respect to the gear casing 18. Thus, the driving power transmitted to the front final reduction gear unit 5 is split into two output components. The two output components are respectively transmitted through the side gear shafts 22 and 22', constant-velocity joints 24 and 24', front wheel drive shafts 23 and 23', constant-velocity joints 26 and 26' and front wheel axles 25 and 25' to the front road wheels 15 and 15', respectively.

On the other hand, the driving power transmitted from the pinion carrier 13d to the ring gear 13b of the planetary gear assembly 13 is transmitted to the branch-off gear 28 and further through the branch-off gear 28 to the driving bevel gear 29 of the right-angle power transfer gear unit 27, causing the driven bevel gear 30 of the unit 27 to turn about its axis of rotation in a fore-and-aft direction of the vehicle chassis. The rotation of the driven bevel gear 30 in turn is transmitted by way of the universal joint 31, propeller shaft 32 and universal joint 33 to the driving bevel pinion 34 and further through the bevel pinion 34 to the bevel ring gear 35 of the rear final reduction gear unit 16 shown in FIG. 1B. The driving power thus transmitted to the rear final reduction gear unit 16 is transmitted through the rotatable differential gear casing and the cross shafts (not shown) of the gear unit 16 to the differential bevel pinions 37. The differential bevel pinions 37 in turn drive the differential side bevel gears 38 and 38' for rotation with respect to the rotatable differential gear casing. The driving power transmitted to the rear final reduction gear unit 16 is thus split into two output components and reduced in speed by means of the gear unit 16. The two split components of the driving power are transmitted through the side gear shafts 39 and 39', constant-velocity joints 41 and 41', rear wheel drive shafts 40 and 40', constant-velocity joints 43 and 43' and rear wheel axles 42 and 42' to the rear road wheels 17 and 17', respectively.

Figure 2A:
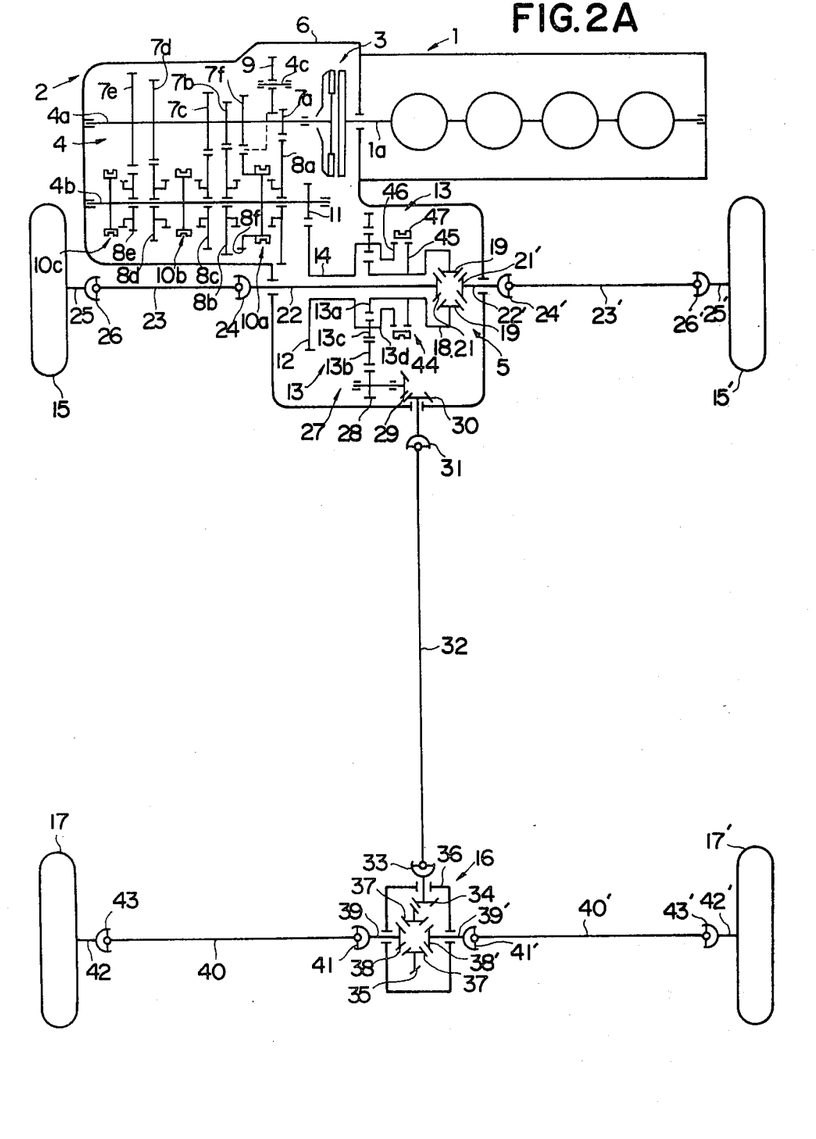
FIG. 2A is a schematic view showing the general construction of a second preferred embodiment of the four-wheel-drive system according to the present invention.
Figure 2B:
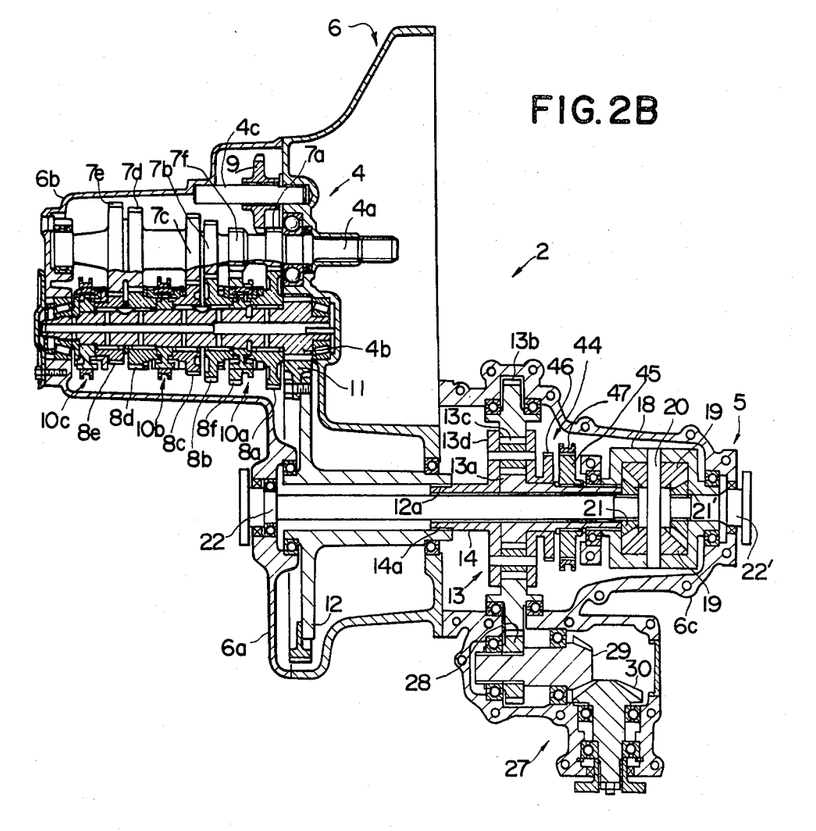
FIG. 2B is a fragmentary sectional view showing part of the detailed construction and arrangement of the embodiment illustrated in FIG. 2A.

Turning to FIGS. 2A and 2B of the drawings, the embodiment herein shown is a modification of the embodiment hereinbefore described with reference to FIGS. 1A and 1B and is characterized by the provision of a lock-up clutch 44 which is adapted to have the sun gear 13a of the planetary gear assembly 13 locked up to the pinion carrier 13d and to thereby neutralize the differential action of the planetary gear assembly 13 when desired.

Such a lock-up clutch 44 comprises an externally serrated first clutch gear 45 coaxially rotatable with the previously mentioned tubular axial extension of the sun gear 13a and an externally serrated second clutch gear 46 rotatable with the pinion carrier 13d about the axis of rotation of the sun gear 13a. The first clutch gear 45 may be securely connected to the tubular axial extension of the sun gear 13a and the second clutch gear 46 may be integral with the pinion carrier 13d and may be rotatably carried on the extension of the sun gear 13a. The first and second clutch gears 45 and 46 are axially spaced apart from each other and have equal diameters.

The lock-up clutch 44 further comprises an internally serrated annular coupling sleeve 47 which is constantly held in mesh with one of the first and second clutch gears such as the first clutch gear 45 as shown in FIG. 2B and is axially movable into and out of mesh with the other of the clutch gears such as the second clutch gear 46 as shown. The coupling sleeve 46 is externally formed with a circumferential groove through which a clutch actuating fork (not shown) is held in circumferentially slidable engagement with the coupling sleeve 47. The clutch actuating fork thus engaging the coupling sleeve 47 in turn is connected through a suitable mechanical linkage to suitable manually or otherwise operated lock-up control means, though not shown in the drawings.

The embodiment of the four-wheel-drive system shown in FIGS. 2A and 2B is in other respects entirely similar to the embodiment of FIGS. 1A and 1B and, for this reason, further description regarding the construction and arrangement of the embodiment of FIGS. 2A and 2B will not be herein incorporated.

When, now, the lock-up clutch 44 constructed and arranged as above described is maintained in an uncoupled condition with the coupling sleeve 47 held in mesh with the first clutch gear 45 alone, the sun gear 13a and the pinion carrier 13d of the planetary gear assembly 13 are permitted to turn independently of each other about the common axis of rotation of the sun and ring gears 13a and 13b. Under this condition, the planetary gear assembly 13 behaves similarly to its counterpart in the embodiment of FIGS. 1A and 1B and is, thus, enabled to undertake a differential gear action, permitting the front and rear road wheels to rotate at different speeds.

When, on the other hand, the lock-up clutch 44 is brought into a coupled condition with the coupling sleeve 47 moved into the axial position bridging both of the first and second clutch gears 45 and 46, the sun gear 13a and the pinion carrier 13d of the planetary gear assembly 13 are locked up together through the clutch 44. The sun gear 13a and the pinion carrier 13d are therefore caused to rotate as a single unit about the common axis of rotation of the sun gear 13a and the ring gear 13b so that the planetary gear assembly 13 as a whole is prohibited from acting as a differential gear unit. If, thus, the clutch 44 is actuated to couple when the vehicle is travelling on, for example, an icy or muddy road and one of the driven road wheels is attempted to race, the driving power transmitted from the speed reduction gear 12 to the planetary gear assembly 13 is split into substantially equalized two output components and is prevented from being totally transmitted to the particular road wheel attempting to race. The output component of the driving power distributed from the pinion carrier 13d to the sun gear 13a locked up to the pinion carrier 13d is transmitted through the front final reduction gear unit 5 to the front road wheels 15 and 15'. Likewise, the output component of the driving power distributed from the pinion carrier 13d to the ring gear 13b is transmitted through the right-angle power transfer gear unit 27, propeller shaft 32 and rear final reduction gear unit 16 to the rear road wheels 17 and 17'.

The planetary gear assembly 13 in each of the embodiments hereinbefore described is used in such a manner as to distribute an input driving power to the front road wheels 15 and 15' through the sun gear 13a and to the rear road wheels 17 and 17' through the ring gear 13b of the gear assembly 13. The planetary gear assembly provided in the four-wheel-drive system according to the present invention can however be used not only in this manner but in such a manner as to distribute an input driving power to the front road wheels 15 and 15' through the ring gear 13b and to the rear road wheels 17 and 17' through the sun gear 13a of the planetary gear assembly 13. The embodiment illustrated in FIGS. 3A and 3B of the drawings is characterized by the planetary gear assembly 13 utilized to realize the latter arrangement.

Figure 3A:
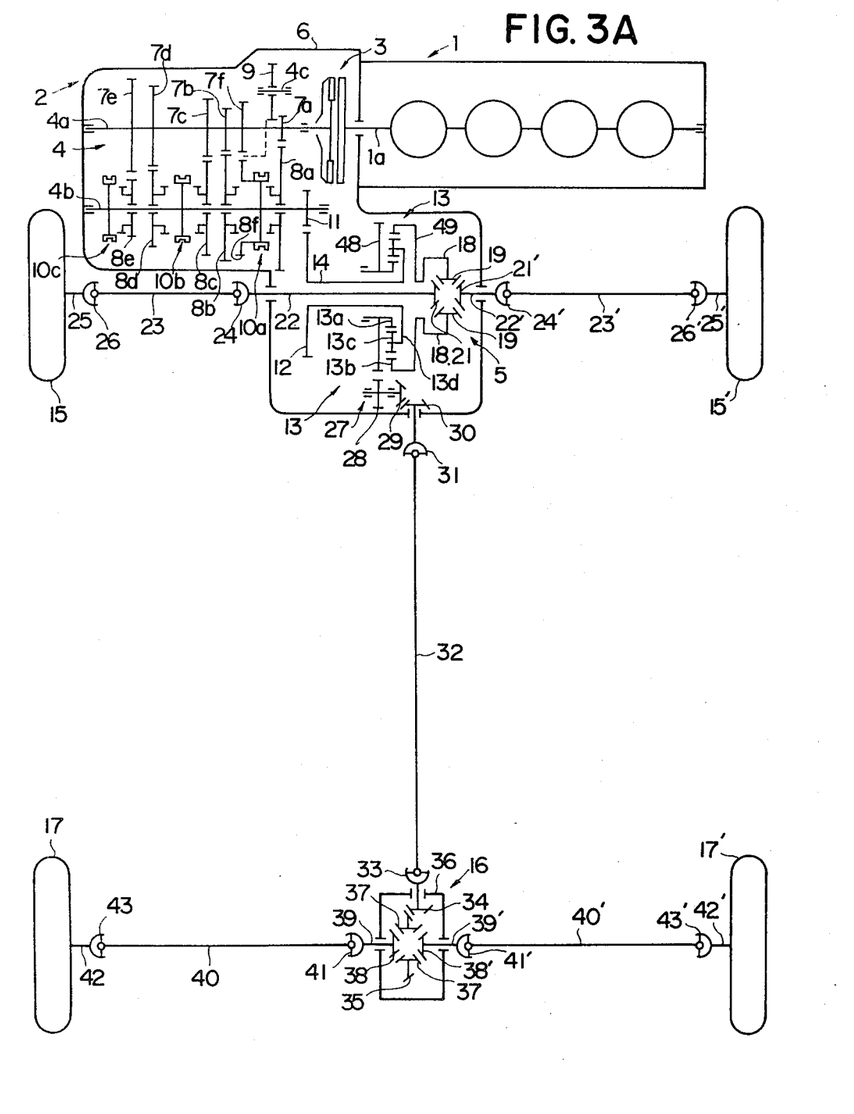
FIG. 3A is a schematic view showing the general construction of a third preferred embodiment of the four-wheel-drive system according to the present invention.
Figure 3B:
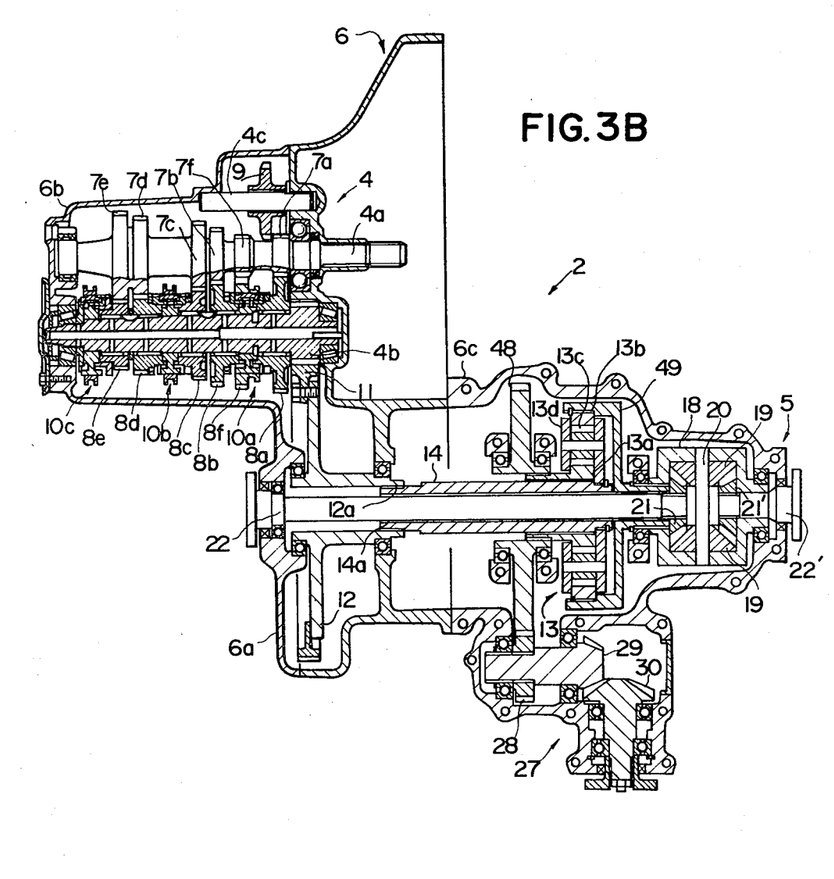
FIG. 3B is a fragmentary sectional view showing part of the detailed construction and arrangement of the embodiment illustrated in FIG. 3A.

Referring to FIGS. 3A and 3B, the sun gear 13a of the planetary gear assembly 13 has a tubular axial extension coaxially rotatable on the tubular axial extension 14 of the pinion carrier 13d. An externally toothed power distributor gear 48 is coaxially mounted on and rotatable with the axial extension of the sun gear 13a and is held in mesh with the branch-off gear 28 of the right-angle power transfer unit 27. The distributor gear 48 has opposite axial extensions of boss portions respectively journaled in suitable bearings supported on the power transfer housing portion 6c of the transaxle casing structure 6. On the other hand, the ring gear 13b of the planetary gear assembly 13 is toothed only internally and is coaxially connected to and rotatable with the rotatable differential gear casing 18 of the front final reduction gear unit 5 by means of a connecting drum 49 coaxially rotatable on an axial portion of the side gear shaft 22. The pinion carrier 13d is detachably connected to and rotatable with the speed reduction gear 12 through the tubular axial extension 14 of the carrier 13d.

The four-wheel-drive system having the planetary gear assembly 13 thus arranged is in other respects entirely similar to the embodiment of FIGS. 1A and 1B and, for this reason, no further description regarding the construction and arrangement of the embodiment shown in FIGS. 3A and 3B will be herein incorporated.

In operation of the system illustrated in FIGS. 3A and 3B, the rotation of the speed reduction gear 12 driven by the transmission output gear 11 is transmitted to the pinion carrier 13d of the planetary gear assembly 13 through the coupling engagement between the gear 12 and the axial extension 14 of the pinion carrier 13d. The pinion carrier 13d is thus caused to rotate with the planet pinions 13c about the common axis of rotation of the sun gear 13a and the ring gear 13b. The driving power transmitted in this manner to the pinion carrier 13d is split into two output components respectively driving the sun gear 13a and the ring gear 13b for rotation about the common axis of rotation thereof. The planetary gear assembly 13 is thus permitted to act as a differential gear unit automatically adjusting the differential speed of rotation between the sun and ring gears 13a and 13b thereof.

The output component of the driving power distributed from the pinion carrier 13d to the ring gear 13b of the planetary gear assembly 13 is transmitted through the connecting drum 49 to the rotatable dfferential gear cassing 18 and accordingly to the cross shafts 20 and, through the cross shafts 20, to the differential bevel pinions 19 of the front final reduction gear unit 5. The differential bevel pinions 19 in turn drive the differential side gears 21 and 21' for rotation with respect to the differential gear casing 18. The driving power transmitted from the ring gear 13b of the planetary gear assembly to the front final reduction gear unit 5 is split into two output components by the final reduction gear unit 5 and is distributed to the wheel axles 25 and 25' for the front road wheels 15 and 15' through the side gear shafts 22 and 22', constant-velocity joints 24 and 24', front wheel drive shafts 23 and 23' and constant-velocity joints 26 and 26', respectively.

On the other hand, the output component of the driving power transmitted to the sun gear 13a of the planetary gear assembly 13 is distributed through the power distributor gear 48 to the branch-off gear 28 and through the branch-off gear 28 to the driving bevel gear 29 of the right-angle power transfer unit 27. This causes the driven bevel gear 30 of the unit 27 to turn about its axis of rotation in a fore-and-aft direction of the vehicle chassis. The rotation of the driven bevel gear 30 in turn is transmitted by way of the universal joint 31, propeller shaft 32 and universal joint 33 to the rear final reduction gear unit 16 shown in FIG. 3A. The driving power thus transmitted from the sun gear 13a of the planetary gear assembly 13 to the rear final reduction gear unit 16 is split into two output components by the final reduction gear unit 16 and is distributed to the wheel axles 42 and 42' for the rear road wheels 17 and 17' through the constant-velocity joints 41 and 41', rear wheel drive shafts 40 and 40' and constant-velocity joints 43 and 43', respectively.

The embodiment of the four-wheel-drive system illustrated in FIGS. 4A and 4B of the drawings is a modification of the embodiment hereinbefore described with reference to FIGS. 3A and 3B and is characterized by the provision of a lock-up clutch 50 which is essentially similar in function to the lock-up clutch 44 provided in the embodiment of FIGS. 2A and 2B.

Figure 4A:
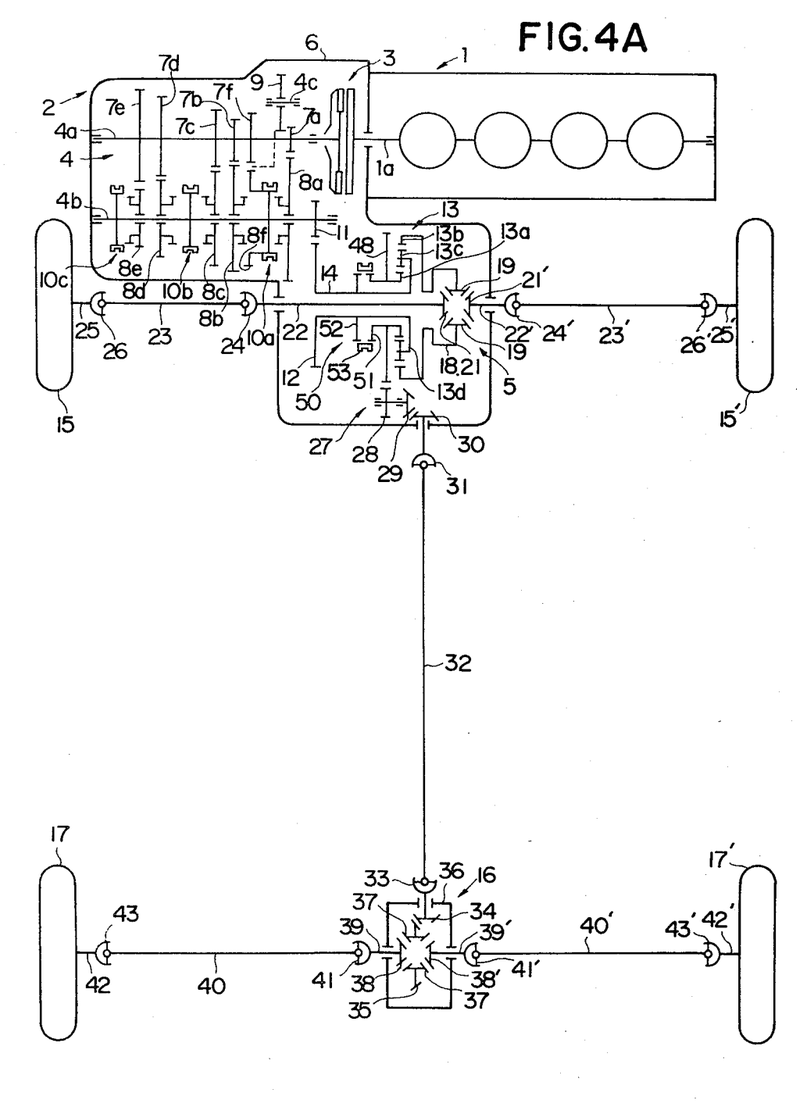
FIG. 4A is a schematic view showing the general construction of a fourth preferred embodiment of the four-wheel-drive system according to the present invention.
Figure 4B:
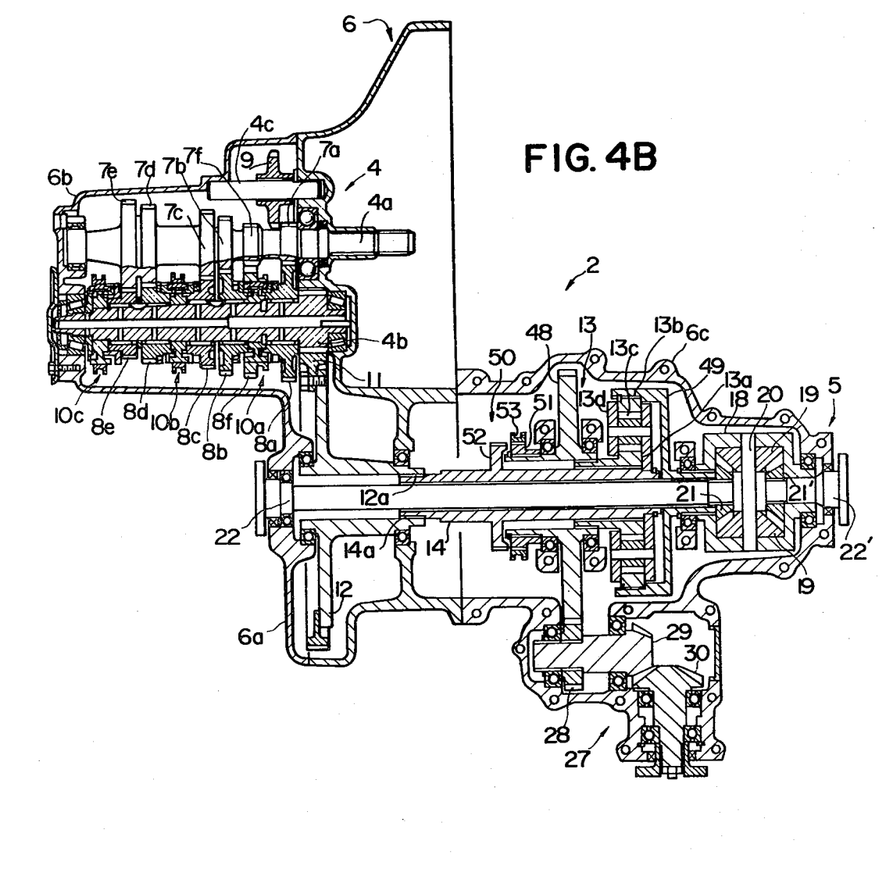
FIG. 4B is a fragmentary sectional view showing part of the detailed construction and arrangement of the embodiment illustrated in FIG. 4A.

The lock-up clutch 50 provided in the embodiment of FIGS. 4A and 4B comprises externally serrated first and second clutch gears 51 and 52. The first clutch gear 51 is coaxially mounted on and rotatable with one of the axial extensions or boss portions of the power distributor gear 48 connected to the sun gear 13a of the planetary gear assmebly 13. The second clutch gear 52 is integral or otherwise coaxially rotatable with the tubular axial extension 14 of the pinion carrier 13d of the planetary gear assembly 13. The first and second clutch gears 51 and 52 are axially spaced apart from each other and have substantially equal diameters. The lock-up clutch 50 further comprises an internally serrated annular coupling sleeve 53 which is constantly held in mesh with one of the first and second clutch gears such as the first clutch gear 51 as shown in FIG. 4B and is axially movable into and out of mesh with the other of the clutch gears such as the second clutch gear 52 as shown. The coupling sleeve 53 is externally formed with a circumferential groove through which a clutch actuating fork (not shown) is held in circumferentially slidable engagement with the coupling sleeve 53. The clutch actuating fork thus engaging the coupling sleeve 53 in turn is connected through a suitable mechanical linkage to suitable manually or otherwise operated lock-up control means, though not shown in the drawings.

The embodiment of the four-wheel-drive system shown in FIGS. 4A and 4B is in other respects entirely similar to the embodiment of FIGS. 3A and 3B and, for this reason, further description regarding the construction and arrangement of the embodiment of FIGS. 4A and 4B will not be herein incorporated.

When, now, the lock-up clutch 50 constructed and arranged as above described is maintained in an uncoupled condition with the coupling sleeve 53 held in mesh with the first clutch gear 51 alone, the sun gear 13a and the pinion carrier 13d of the planetary gear assembly 13 are permitted to turn independently of each other about the common axis of rotation of the sun and ring gears 13a and 13b. Under this condition, the planetary gear assembly 13 behaves similarly to its counterpart in the embodiment of FIGS. 3A and 3B and is, thus, enabled to undertake a differential gear action, permitting the front and rear road wheels to rotate at different speeds.

When, on the other hand, the lock-up clutch 50 is brought into a coupled condition with the coupling sleeve 53 moved into the axial position bridging both of the first and second clutch gears 51 and 52, the sun gear 13a and the pinion carrier 13d of the planetary gear assembly 13 are locked up together through the clutch 50 and the power distributor gear 48. The sun gear 13a and the pinion carrier 13d are therefore caused to rotate as a single unit about the common axis of rotation of the sun gear 13a and the ring gear 13b so that the planetary gear assembly 13 as a whole is prohibited from acting as a differential gear unit. If, thus, the clutch 50 is actuated to couple when the vehicle is travelling on, for example, an icy or muddy road and one of the driven road wheels is attempting to race, the driving power transmitted from the speed reduction gear 12 to the planetary gear assembly 13 is split into substantially equalized two output components and is prevented from being totally transmitted to the particular road wheel attempting to race. The output component of the driving power distributed from the pinion carrier 13d to the sun gear 13a locked up to the pinion carrier 13d is transmitted through the front final reduction gear unit 5 to the front road wheels 15 and 15'. Likewise, the output component of the driving power distributed from the pinion carrier 13d to the ring gear 13b is transmitted through the right-angle power transfer gear unit 27, propeller shaft 32 and rear final reduction gear unit 16 to the rear road wheels 17 and 17'.

Form the foregoing description, it will have been appreciated that the four-wheel-drive system according to the present invention is characterized, inter alia, in the following respects:

(1) The output shaft 4b of the power transmission gear unit 4, provided in combination with the engine 1 positioned to have its output shaft 1a in a lateral direction of a four-wheel-driven vehicle, is coupled to the front and rear final reduction gear unis 5 and 16 through the planetary gear assembly 13 arranged to be capable of providing a differential action. The availability of the passenger and baggage spaces of the vehicle is for this reason significantly unencumbered and, in addition, the driveline for the four-wheel-drive vehicle can be constructed and arranged compactly.

(2) The four-wheel-drive system can be readily modified into a driving system for a two-wheel-driven or four-wheel-driven vehicle. Such modification can be made simply by separating the power transfer housing portion 6c from the clutch and transmission gear housing portions 6a and 6b of the transaxle casing structure 6 and removing the axial extension 14 of the pinion carrier 13d of the planetary gear assembly 13. A housing having the front final reduction gear unit 5 enclosed therein is then attached to the clutch housing portion 6a with the differential gear casing 18 of the front final reduction gear unit 5 splined or otherwise connected to the speed reduction gear 12 through the axial bore in the gear 12. In this instance, it will be advantageous for the compactness of the construction of the driveline to have the side gear shaft 22 arranged to axially extend through the axial bore in the speed reduction gear 12 and the axial bore in the sun gear 13a of the planetary gear assembly 13.

While the present invention has been described as using a manually-operated five-forward-speed and one-reverse speed power transmission gear unit, it will be apparent that the four-wheel-drive system according to the present invention may use a manually-operated power transmission gear unit of another type or an automatically-operated or stepless power transmission system. Although, furthermore, it has been assumed that the power unit in each of the embodiments hereinbefore described is constituted by an internal combustion engine positioned at the front of a vehicle, this is simply by way of example and, thus, the power unit of the vehicle drive system according to the present invention may be constituted by any other type of power unit and may be positioned at the rear of a vehicle.

What is claimed is:

1. A four-wheel-drive system for a vehicle having at least two pairs of road wheels consisting of a pair of front road wheels and a pair of rear road wheels, comprising
   a power unit having an output shaft rotatable about an axis in a lateral direction of the vehicle;
   a power transmission gear unit including transmission input and output shafts each having an axis of rotation substantially parallel with the axis of rotation of the output shaft of said power unit, and gears mounted on said transmission input and output shafts and arranged to be capable of selectively producing a plurality of ratios between the speeds of rotation of the transmission input and output shafts;
   a speed reduction gear with which the transmission output shaft is held in driving engagement for driving the reduction gear to rotate about an axis of rotation thereof;
   a first final reduction gear unit including a differential gear casing and gears arranged to split an input driving power into two output components to be transmitted to one of said two pairs of road wheels;
   a second final reduction gear unit including gears arranged to split an input driving power into two output components to be transmitted to the other of said two pairs of road wheels; and
   a planetary gear assembly including an externally toothed sun gear rotatable about an axis of rotation thereof, an internally toothed ring gear coaxially encircling said sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together so that the planet pinions are revolvable together around the axis of rotation of the sun gear, wherein said speed reduction gear is held in driving engagement with said pinion carrier, one of the sun gear and the ring gear being in driving engagement with one of said first and second final reduction gear units and the other of the sun and ring gears being in driving engagement with the other of the first and second final reduction gear unit,
   wherein said speed reduction gear has its axis of rotation substantially in parallel with the input and output shafts of said transmission gear unit;
   wherein the sun gear, the ring gear and the pinion carrier of said planetary gear assembly have their common axis of rotation substantially in line with the axis of rotation of said speed reduction gear; and wherein the differential gear casing of said first final reduction gear unit has its common axis of rotation substantially in line with the axis of rotation of said speed reduction gear.

2. A four-wheel-drive system as set forth in claim 1, further comprising lock-up clutch means operatively intervening between the sun gear and the pinion carrier of said planetary gear assembly and operative to couple the sun gear and the pinion carrier when actuated.

3. A four-wheel-drive system as set forth in claim 1, in which said speed reduction gear is formed with an axial bore having a center axis substantially aligned with said common axis and the sun gear of said planetary gear assembly is formed with an axial bore having a center axis substantially coincident with said common axis and in which said first final reduction gear unit is positioned closer to said power transmission gear unit than said second final reduction gear unit, said first final reduction gear unit being connected to two output shafts one of which is positioned closer to the power transmission gear unit than the latter, the output shaft closer to the transmission gear unit axially extending in part through the axial bore in the sun gear of said planetary gear assembly and in part through the axial bore in said speed reduction gear.

4. A four-wheel-drive system as set forth in claim 1 in which the pinion carrier of said planetary gear assembly is detachably connected to said speed reduction gear.

5. A four-wheel-drive system as set forth in claim 4, further comprising a casing structure including a first portion having said speed reduction gear enclosed therewithin and a second portion having said planetary gear assembly enclosed therewithin, said second portion being detachably connected to said first portion.

6. A four-wheel-drive system as set forth in claim 5, in which the first and second portions of said casing structure are detachably connected together in the neighbourhood of the coupling between said speed reduction gear and said pinion carrier.

7. A four-wheel-drive system as set forth in claim 5, in which said speed reduction gear has its axis of rotation substantially in parallel with the input and output shafts of said transmission gear unit and in which the sun gear, the ring gear and the pinion carrier of said planetary gear assembly have their common axis of rotation substantially in line with the axis of rotation of said speed reduction gear.

8. A four-wheel-drive system as set forth in claim 7, in which said speed reduction gear is formed with an axial bore having a center axis substantially aligned with said common axis and the sun gear of said planetary gear assembly is formed with an axial bore having a center axis substantially coincident with said common axis and in which said first final reduction gear unit is positioned closer to said power transmission gear unit than said second final reduction gear unit, said first final reduction gear unit being connected to two output shafts one of which is positioned closer to the power transmission gear unit than the latter, the output shaft closer to the transmission gear unit axially extending in part through the axial bore in the sun gear of said planetary gear assembly and in part through the axial bore in said speed reduction gear.

* * * * *